Aug. 11, 1931.  W. S. BAYLIS  1,818,452
PROCESS OF PURIFYING VEGETABLE OIL
Filed Jan. 18, 1926
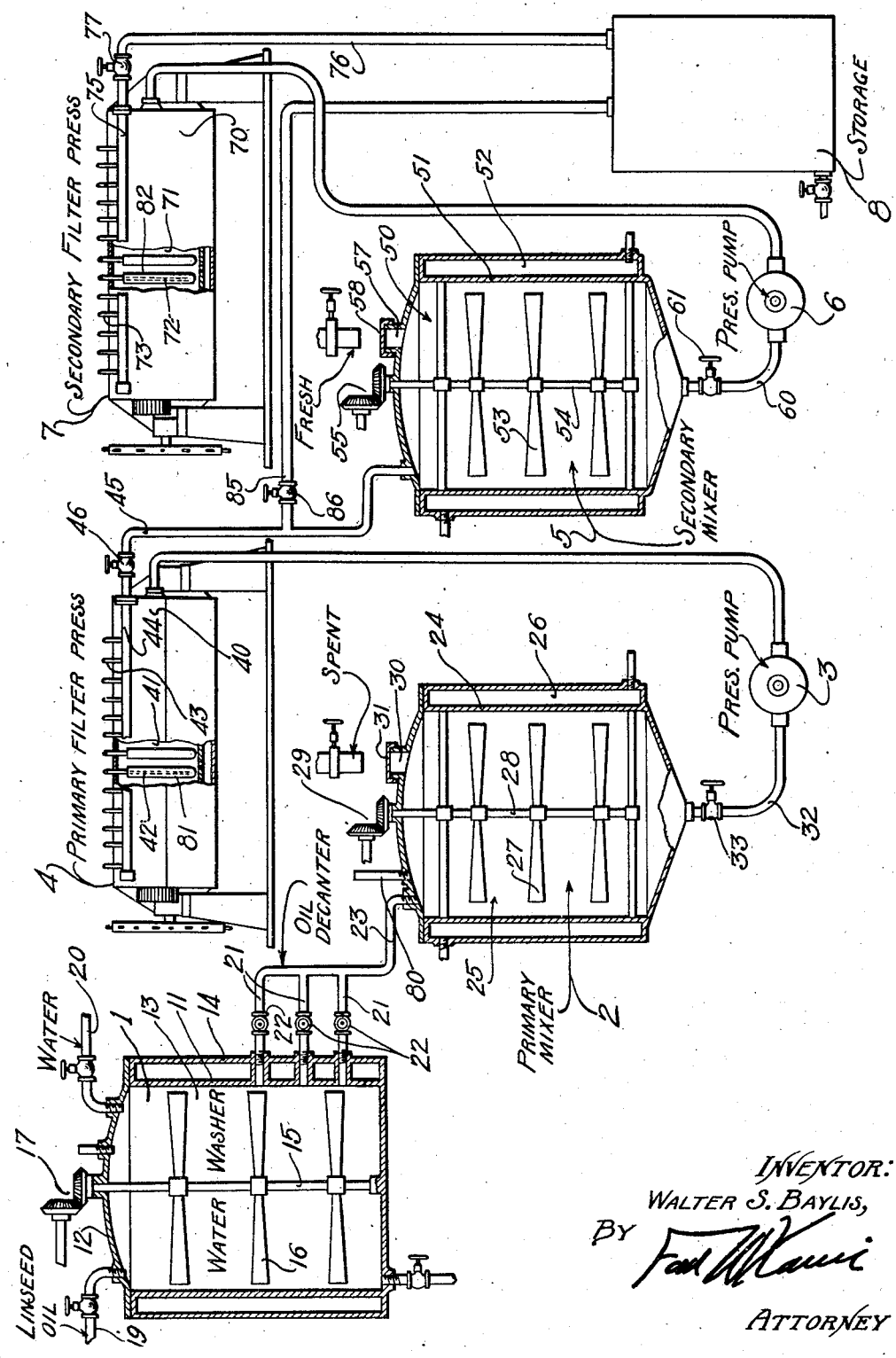
INVENTOR:
WALTER S. BAYLIS,
BY
ATTORNEY Patented Aug. 11, 1931

1,818,452

UNITED STATES PATENT OFFICE

WALTER S. BAYLIS, OF LOS ANGELES, CALIFORNIA, ASSIGNOR, BY MESNE ASSIGNMENTS, TO FILTROL COMPANY OF CALIFORNIA, A CORPORATION OF CALIFORNIA

PROCESS OF PURIFYING VEGETABLE OIL

Application filed January 18, 1926. Serial No. 81,996.

My invention relates to the treatment of fixed oils and is particularly applicable to treating raw linseed oil. Raw linseed oil and other animal and vegetable oils contain albuminous and mucilaginous matter which are known in the art as "break", and which must be removed from the linseed oil before it can be used for certain purposes. There is a considerable demand for raw linseed oil which has the break removed and which is bleached to a lighter color than its natural color.

It is an object of this invention to provide a process for removing break from linseed oil and for simultaneously bleaching it to a lighter color.

I have found that the break may be removed from linseed oil and similar fixed oils and the oil may be bleached to a lighter color by mixing it with a treated clay or with fuller's earth or the like, the comminuted mineral which is used being of a highly adsorptive character. After thoroughly mixing linseed or other fixed oil with such an adsorptive agent, the oil is filtered from the agent in a condition free from the break and bleached to a lighter color.

It is accordingly an object of this invention to provide a process of treating a fixed oil which involves the subjecting of the oil to the action of an adsorptive agent.

I have found that in some instances it is advantageous to use activated vegetable carbon with the agent, and it is an object of this invention to provide a process in which a fixed oil is subjected to the action of a treated clay and an activated vegetable carbon.

In treating such a fixed oil, it is sometimes beneficial to water-wash the oil before subjecting it to the action of treated clay. I find that if the oil is heated to about 42° C. and then mixed with 10 per cent water, after which the oil is decanted and treated with an adsorptive agent, a very complete refining of the oil results.

It is therefore one object of this invention to provide a process of treating a fixed oil which involves water-washing the oil and afterwards subjecting it to the action of an adsorptive agent.

Other objects and advantages of the invention will be made evident hereinafter.

Referring to the drawing in which I illustrate an apparatus suitable for treating linseed oil or the like.

1 is a water washer, 2 is a primary mixer, 3 is a pressure pump, 4 is a primary filter, 5 is a secondary mixer, 6 is a pressure pump, 7 is a secondary filter press and 8 is a storage tank.

The water washer 1 consists of a shell 11 having a top 12 and providing a water-washing chamber 13. The chamber 13 is surrounded by a heating jacket 14. Extending into the washing chamber 13 is a shaft 15 which carries agitating paddles 16. The shaft 15 is rotatably driven by bevel gears 17 situated at the upper end of the shaft 15. Linseed oil is introduced into the water washer 1 through a pipe 19, and water is introduced into the washing chamber 13 through a pipe 20. Connected to the washing chamber 13 through the side thereof at different levels are three decanting pipes 21, each having a valve 22. The decanting pipes 21 connect with a pipe 23 which extends to the primary mixer 2.

The primary mixer 2 consists of a shell 24 which provides a mixing chamber 25 and which is surrounded by a heating jacket 26. Mixing paddles 27 are placed inside the mixing chamber 25 and are secured on a shaft 28 which extends to the exterior of the chamber 25 and is driven by bevel gears 29. Treated clay is introduced into the mixing chamber 25 through an opening 30 which is ordinarily closed by a cover 31. Extending from the bottom of the primary mixer 2 and connected to the primary filter 4 is a pipe 32 having a valve 33 placed directly adjacent to the point at which the pipe connects to the bottom of the primary mixer 2. The pipe 32 includes the pressure pump 3 by means of which a mixture is pumped into the primary filter press 4.

The primary filter press 4 consists of a shell 40 having a filter chamber 41, in which filter chamber are placed filter bags 42. Pipes 43 connect to the interior of the filter bags 42 and connect to a manifold pipe 44.

The manifold pipe 44 is connected to a pipe 45 having a valve 46, which pipe 45 extends to the secondary mixer 5.

The pipe 45 extends in communication with a mixing chamber 50 which is provided by a shell 51 which has a heating jacket 52. Agitating paddles 53 are positioned in the mixing chamber 50 and are secured to a shaft 54 which extends to the exterior of the mixing chamber 50 and is operated by bevel gears 55. Treated clay is introduced into the mixing chamber 50 through an opening 57 which is ordinarily closed by a cover 58. Connected to the bottom of the secondary mixer 5 is a pipe 60 which is extended and connected to the secondary filter press 7, this pipe 60 having a valve 61 which is included therein directly adjacent to the point at which it connects with the bottom of the secondary mixer 5. The pipe 60 includes the pressure pump 6 by means of which a mixture is taken from the mixing chamber 50 and delivered to the secondary filter press 7.

The secondary filter press 7 consists of a shell 70 having a filter chamber 71 in which filter bags 72 are placed. The filter bags 72 have branch pipes 73 connected to the interiors thereof, which branch pipes 73 connect to a manifold pipe 75. The manifold pipe 75 has a pipe 76 connected therethrough which extends to the storage tank 8, this pipe 76 having a valve 77 included therein.

The process of my invention is conducted as follows:

We will first consider that portion of my invention which involves the double treating of linseed oil with treated clay. The linseed oil to be treated in this case may be introduced into the mixing chamber 25 of the primary mixer 2 through a linseed oil pipe 80 which is in communication with the mixing chamber 25. The linseed oil in its raw condition contains, as previously mentioned, considerable dispersions in the form of albuminous and mucilaginous matter which must be removed therefrom to make it useful for certain purposes. An adsorptive agent, in the form of treated clay, is introduced into the mixing chamber 25 through the opening 30. I prefer to use the commercial clay adsorbent known as "Filtrol". This material is made by extracting bentonite or smectite type clays with hot dilute sulfuric acid and then drying the residue, which is the adsorbent. Such clay is hereinafter referred to as "treated clay" or "acid-activated clay." In my invention I find it economical to use treated clay in the primary mixer which is spent, that is to say, the treated clay which has been used once in the secondary mixer 5, this treated clay being taken from the secondary filter 7. Sufficient of this spent treated clay is introduced to bring about a partial absorption of the albuminous and mucilaginous matter contained in the oil, the exact amount being determined by experiment. This spent treated clay is added to the raw linseed oil while it is cool in amount ranging from 1% to 6% by weight of oil, meanwhile agitating. Steam or other heating agent is then introduced into the heating jacket 26, and the temperature of the mixture in the mixing chamber 25 is gradually raised to approximately 210° F. or 212° F. This temperature to which the oil is raised is not invariable, depending on the type of treated clay used. During this time the linseed oil and treated clay are thoroughly agitated by action of the agitating paddles 27, this bringing the treated clay into intimate contact with the linseed oil. The mixture in the mixing chamber 25 is maintained at a temperature of about 212° F. for from five to thirty minutes. The treated clay absorbs considerable of the dispersions in the linseed oil and also has adsorptive action which tends to bleach the linseed oil to a lighter color.

The valve 33 in the pipe 32 is then opened and the pressure pump 3 is set into operation. The mixture in the mixing chamber 25 is then drawn therefrom and delivered to the filter chamber 41 of the primary filter press 4. The linseed oil passes through the filter bags 42 and through the pipes 43 into the manifold pipe 44. The treated clay cannot pass through the fine mesh of the filter bags 42 and, therefore, collects in the filter chamber 41 and on the filter bags 42 in the form of cakes, as indicated at 81.

The linseed oil passes from the manifold pipe 44 through the pipe 45 to the mixing chamber 50 of the secondary mixer 5, the valve 46 in the pipe 45 at this time being open. The linseed oil when it reaches the mixing chamber 50 is quite cool. Fresh treated clay is then introduced into the mixing chamber 50 through the opening 57, in sufficient quantity to complete the removal of the albuminous and mucilaginous matter, after which the agitating paddles 53 are set into operation, and a heating agent such as steam is passed into the heating jacket 52. The linseed oil and fresh treated clay are thus thoroughly mixed by the agitating paddles 53 and the mixture is heated by the heating agent passing through the heating jacket 52 to a temperature which is substantially the same as that used in the primary mixer 2. This second mixture in the mixing chamber 50 is maintained at a temperature near 212° F. for a short period of time, during which time agitation is continued. The second treatment of linseed oil by the fresh treated clay absorbs the albuminous and mucilaginous matter which was not absorbed by the spent treated clay in the primary mixer 2. The fresh treated clay also has an adsorptive action on the linseed oil which bleaches to a lighter color.

After this treatment has taken place, the valve 61 in the pipe 60 is opened and the pressure pump 6 is set into operation, so as to pass the mixture from the mixing chamber 50 into the secondary filter press 7. The action in the secondary filter press 7 is the same as the action in the filter press 4, the linseed oil passing through the filter bags 72 through the branch pipe 73 and into the manifold 75 and the treated clay collecting in cakes 82 on the filter bags 72. The valve 77 in the pipe line 76 being opened the liquid oil passes from the manifold pipe 75 through the pipe 76 into the storage tank 8. When the linseed oil reaches the storage tank 8 it is free from albuminous and mucilaginous matter and is bleached to a lighter color than its natural color, being ready for market.

I have found that it is sometimes desirable to add activated vegetable carbon to the treated clay. This may be done by mixing the carbon with the treated clay before it is introduced into the secondary mixer, or it may be added to the mixture in the secondary mixer after the treated clay has been added to the linseed oil.

When the linseed oil is water-washed before being subjected to the action of treated clay, the linseed oil is first passed into the washing chamber 13 through the pipe 19. A heating agent such as steam is passed through the heating jacket 14 and the linseed oil is heated to a temperature of about 42° C. After this, water at atmospheric temperature is slowly added to the linseed oil by means of the pipe 20 until there is about ten per cent water to linseed oil in the washing chamber 13. During the time that the water is introduced into the washing chamber 13 the agitating paddles 16 are in operation and the linseed oil is slowly stirred from five to thirty minutes after the water has been added to the linseed oil. The agitating paddles 16 are then stopped and the water is allowed to settle for a suitable time, say a half-hour, depending on the grade of oil under treatment, whereafter the linseed oil is decanted from the water washer 1 through either or both of the decanting pipes 21, the valves 22 being opened. The water treated linseed oil passes into the mixing chamber 25 through the pipe 23. The water-washing action on the linseed oil removes a portion of the albuminous and mucilaginous matter from the oil. The water-washed linseed oil is then subjected to the action of treated clay in a manner as previously described. I have found from experience that if the linseed oil is water-washed it is usually only necessary to subject the linseed oil once to the action of treated clay. Therefore, the linseed oil which has been water-washed may be taken directly from the primary filter 4 and passed to the storage tank 8 through a pipe 85 which has a valve 86.

If a specially fine oil is desired to be produced, a second decolorizing treatment is given to it with fresh treated clay, say 4 percent, and $\frac{1}{10}$% by weight of oil, of good fresh decolorizing carbon. During this treatment, the oil should not be heated to a temperature greater than 200° F. and not lower than 150° F.

The following is a specific example of the process:

One hundred pounds of crude linseed oil is heated to 42° C. with ten pounds of water, the mixture being stirred gently meanwhile. After fifteen minutes' stirring, the agitation is stopped for a half hour to allow settling, and the oil decanted. Ten pounds of partially spent "Filtrol" is then added, and the mixture heated to 200° F. for fifteen minutes with vigorous stirring. The oil is then cooled and filtered, and then four pounds of new "Filtrol" and one-fourth pound of new decolorizing carbon is added. The oil is once more heated to 200° F., stirred vigorously for fifteen minutes and then cooled and filtered.

My invention is very valuable to the art, since the linseed oil treated in accordance therewith is of a very high grade and is bleached to the desired color. The feature of using spent treated clay for treating the linseed oil the first time is quite economical although not entirely necessary, since fresh treated clay might be used, as is obvious. My invention is very valuable, since the linseed oil is both freed of albuminous and mucilaginous matter and is bleached simultaneously, thus eliminating a second treatment of the linseed oil as is necessary in processes which only remove the albuminous and mucilaginous matter from the oil.

In this process I prefer to use an adsorptive mineral which is highly dehydrated. I find that the drier the adsorptive agent the lower the temperature necessary to remove the dispersions, it being advantageous to keep the oil temperature as low as possible.

I claim as my invention:

1. A process of treating a vegetable oil which comprises: agitating said oil with about 10 per cent of water at a temperature of about 42° C.; discontinuing the agitation and allowing the heavy matter to settle out of said oil; decanting the partially purified oil from above said heavy matter; primarily agitating said partially purified oil with a partially spent acid-activated clay; filtering said clay from said oil; secondarily agitating the oil after said oil has been freed from said clay, with a virgin acid-activated clay; and filtering the contaminated virgin clay from said oil.

2. A process of treating a vegetable oil which comprises: agitating said oil with about 10 per cent of water at a temperature of about 42° C.; discontinuing the agitation and allowing the heavy matter to settle out of said oil; decanting the partially purified oil from above said heavy matter; primarily agitating said partially purified oil with an acid-activated decolorizing clay; filtering said clay from said oil; secondarily agitating the oil after said oil has been freed from said clay, with fresh decolorizing clay and an activated vegetable carbon; and filtering the contaminated virgin clay and said carbon from said oil.

In testimony whereof, I have hereunto set my hand at Los Angeles, California, this 12th day of January, 1926.

WALTER S. BAYLIS.